Patented July 16, 1946

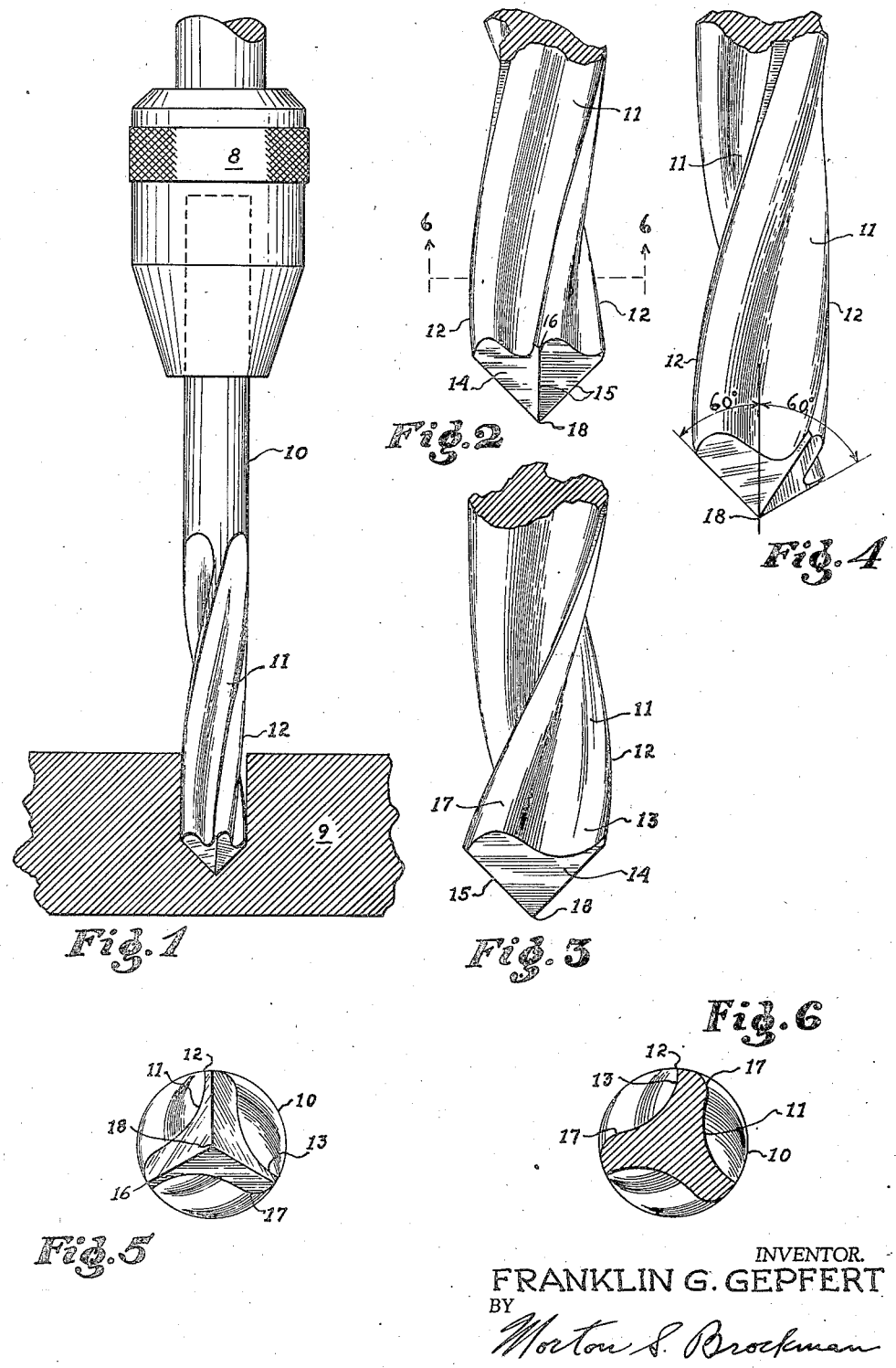

2,404,049

UNITED STATES PATENT OFFICE 2,404,049

DRILL

Franklin G. Gepfert, Shaker Heights, Ohio

Application August 30, 1944, Serial No. 551,842

2 Claims. (Cl. 77—70)

This invention relates to drills and particularly to metal drills used for perforating hardened materials.

This invention is an improvement of the drill previously invented by me and for which a patent application, Serial No. 548,150, filed August 5, 1944, is pending in the U. S. Patent Office.

The primary object of this invention is to provide a drill of the type mentioned which more rapidly removes the chips or shavings from the hole and which remains sharp for a longer period of time.

Another object is to provide a drill which produces a smoother side wall and fewer burrs in the hole being drilled.

These and other objects of the invention will become apparent from a reading of the following specification and claims, together with the accompanying drawing, in which like parts are referred to and indicated by like reference characters and wherein:

Figure 1 is a view of the improved drill as it would appear mounted in a collet chuck or holder;

Figure 2 is an enlarged elevational view of a portion of a drill as viewed from one certain angle;

Figure 3 is a view similar to that of Figure 2 but viewed from another angle;

Figure 4 is a view similar to that of Figures 2 and 3 but viewed from still another direction and also showing the size of the angles of the facets and ridges on the end of the drill;

Figure 5 is a bottom end view of the drill; and

Figure 6 is a horizontal cross section thereof, taken along the lines and in the direction of the arrow 6—6 of the Figure 2.

Referring to the drawing, there is shown in the Figure 1 a drill mounted in a chuck or holder 8 and penetrating the work 9.

The preferred form of drill consists of a round, smooth shank portion 10 and a body portion having three spiraliform flutes 11 and three helical fillets 12. The flutes and fillets appear to twist around the body portion as illustrated in the drawing. Each of the spiraliform flutes 11 are wavy and undulated substantially lengthwise between the helical fillets 12. Each flute has a concave surface portion 13 and a convex surface portion 17. The surface portions 13 and 17 have substantially the same area and blend with or flow into each other to form a wave. The fillets 12 are relatively sharp and are formed by the junction of adjacent concave and convex surfaces meeting as shown in the Figures 5 and 6.

The bottom or cutting end of the drill has a sharp point 18 on the longitudinal axis thereof. It has three straight longitudinally and radially extending ridges 15 which extend from the axial point 18 to points 16 slightly to the rear of the lower ends of each fillet 12 as shown in the Figures 2 and 5. The flat facets 14 are ground at an angle of forty degrees to the longitudinal axis of the drill and when a drill is thus made with three such facets, as is shown in the drawing, the ridges 15 will then be at an angle of approximately sixty degrees to the longitudinal axis. This is clearly shown in the Figure 4 of the drawing. A satisfactory drill may also be made with four similar flutes and fillets.

It will now be clear that there is provided by this invention a drill which accomplishes the objects heretofore set forth. While this invention is disclosed in its preferred form, it should be understood that there may be other forms or adaptations of the invention which may also come within the scope of the appended claims. For example, the drill illustrated is designed for a rotating holder which rotates clockwise, and similarly a drill having substantially the same specifications may be made with reverse spiraliform flutes and fillets for occasions when the drill is held stationary and the work is rotated.

I claim:

1. A drill, comprising in combination, a shank portion receivable by a holder, an undulated body portion integral with the shank portion and having a plurality of alternately extending concave and convex portions, a first two adjacent concave and convex portions forming a lateral spiraliform wave and a second two adjacent convex and concave portions forming an acute helical fillet, and an end portion integral with the body portion having a projecting axial point thereon, the said end portion also having ridges extending longitudinally and radially from the said point to each of the helical fillets and facets between the ridges extending to each of the spiraliform waves.

2. A drill, comprising in combination, a shank portion receivable by a holder, an undulated body portion integral with the shank portion and having six alternately extending concave and convex portions, a first two adjacent concave and convex portions forming a lateral spiraliform wave and a second two adjacent convex and concave portions forming an acute helical fillet, and an end portion integral with the body portion having a projecting axial point thereon, the said end portion also having three ridges extending longitudinally and radially from the said point to the three helical fillets and three facets between the ridges extending to the three spiraliform waves.

FRANKLIN G. GEPFERT.